(12) United States Patent
Fett et al.

(10) Patent No.: US 9,334,949 B2
(45) Date of Patent: May 10, 2016

(54) ROTARY SHIFTING DEVICE WITH MOTORIZED KNOB

(71) Applicant: GHSP, Inc., Grand Haven, MI (US)

(72) Inventors: Brian W. Fett, Spring Lake, MI (US); Dale Beattie, Muskegon, MI (US)

(73) Assignee: GHSP, INC., Grand Haven, MI (US)

( * ) Notice: Subject to any disclaimer, the term of this patent is extended or adjusted under 35 U.S.C. 154(b) by 0 days.

(21) Appl. No.: 14/485,065

(22) Filed: Sep. 12, 2014

(65) Prior Publication Data

US 2015/0167827 A1 Jun. 18, 2015

Related U.S. Application Data

(60) Provisional application No. 61/915,621, filed on Dec. 13, 2013.

(51) Int. Cl.
*F16H 59/08* (2006.01)
*F16H 59/02* (2006.01)

(52) U.S. Cl.
CPC ............. *F16H 59/08* (2013.01); *F16H 59/02* (2013.01); *F16H 59/0278* (2013.01); *F16H 2059/081* (2013.01); *Y10T 74/2014* (2015.01)

(58) Field of Classification Search
CPC combination set(s) only.
See application file for complete search history.

(56) References Cited

U.S. PATENT DOCUMENTS

| | | | | |
|---|---|---|---|---|
| 3,524,979 A * | 8/1970 | Cohen | ................... | B62M 25/04 116/28.1 |
| 3,901,097 A * | 8/1975 | Williams | ............... | B60K 37/06 116/DIG. 20 |
| 5,598,740 A | 2/1997 | Itoh | | |
| 6,295,887 B1 * | 10/2001 | DeJonge | ................ | B60K 37/06 477/99 |
| 6,564,661 B2 | 5/2003 | DeJonge | | |
| 9,052,007 B2 * | 6/2015 | Lai | ......... | F16H 57/033 |
| 2014/0007726 A1 * | 1/2014 | Muraki | ................... | F16H 59/08 74/473.3 |
| 2015/0027861 A1 * | 1/2015 | Hoskins | ................. | F16H 59/08 200/43.11 |

(Continued)

FOREIGN PATENT DOCUMENTS

| | | |
|---|---|---|
| CA | 752558 A | 2/1967 |
| SU | 258797 A1 | 4/1970 |
| WO | 2013123375 A2 | 8/2013 |

OTHER PUBLICATIONS

International Search Report and the Written Opinion of the International Searching Authority, or the Declaration; International Appln. No. PCT/US2014/058607; Dated Feb. 5, 2015; pp. 1-6.

*Primary Examiner* — Nicole Verley
(74) *Attorney, Agent, or Firm* — Price Heneveld LLP

(57) ABSTRACT

A shifter apparatus, according to one embodiment, is configured for operating a transmission controller of a vehicle and includes a selection knob that is rotatable between first and second angular positions for selecting an operating mode of the transmission controller. The shifter apparatus also includes a swing arm that is pivotal between an unlocked position spaced from the selection knob and a locked position engaged with the selection knob to prevent rotation thereof. Further, the shifter apparatus includes a motor configured to pivot the swing arm from the locked position to the unlocked position when a disengagement condition is satisfied for selecting a different operating mode. The shifter apparatus may also include a drive gear that is movable to an engaged position between the motor and the selection knob, such that the motor may automatically rotate the selection knob from the first angular position to the second angular position.

21 Claims, 12 Drawing Sheets

(56) References Cited

U.S. PATENT DOCUMENTS

2015/0114158 A1* 4/2015 TenBrink ............ F16H 59/0278
74/473.25

2015/0152958 A1* 6/2015 Watanabe ............... F16H 59/08
74/473.12

* cited by examiner

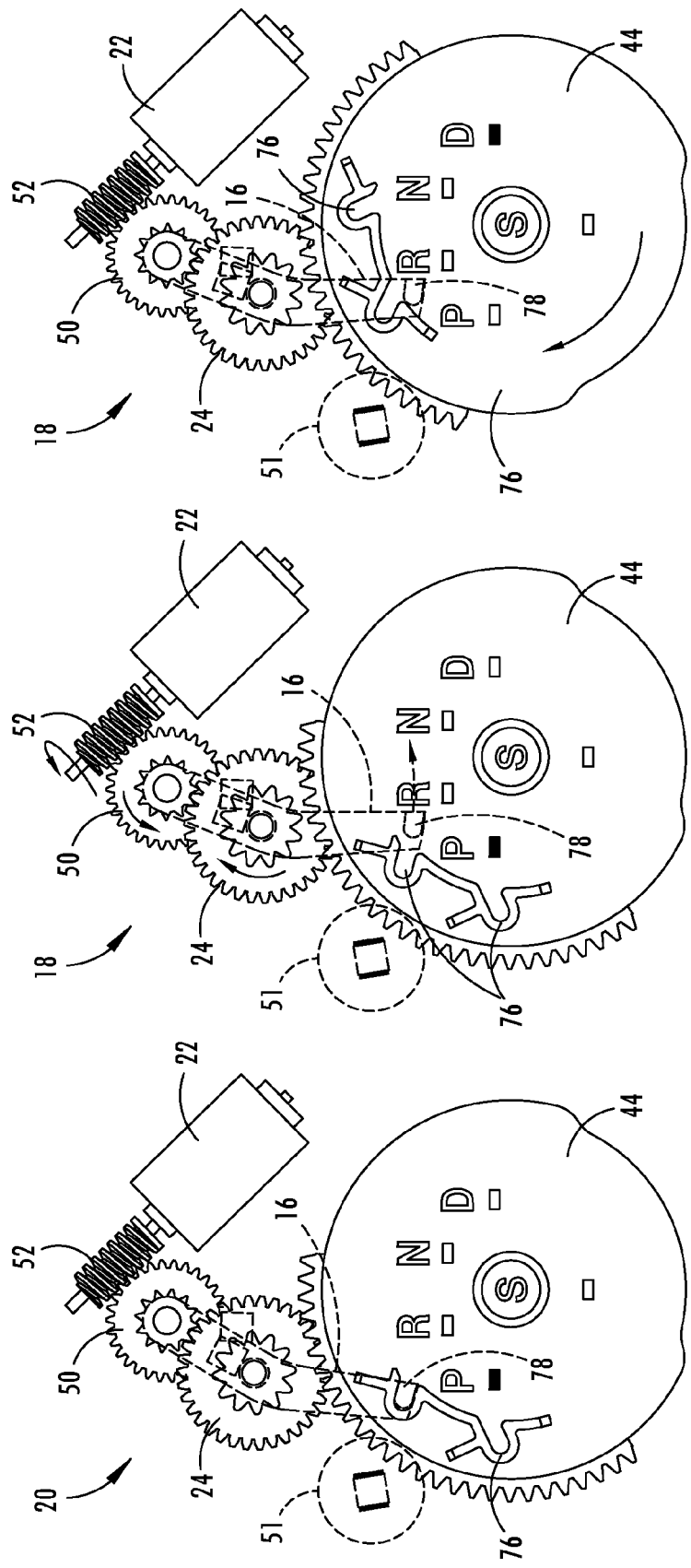

ROTARY SHIFTING DEVICE WITH MOTORIZED KNOB

CROSS-REFERENCE TO RELATED APPLICATIONS

This application claims priority under 35 U.S.C. §119(e) to, and the benefit of, U.S. Provisional Patent Application No. 61/915,621, entitled "ROTARY SHIFTING DEVICE WITH MOTORIZED KNOB," filed on Dec. 13, 2013, the entire disclosure of which is hereby incorporated by reference.

FIELD OF THE INVENTION

The present invention generally relates to rotary shifting devices, shifter apparatuses, shifting systems, and methods for rotatably shifting vehicle transmissions, and further relates to such shifting devices that have a motorized knob.

BACKGROUND OF THE INVENTION

Modern vehicles often include electronic shifters that communicate electrically with a vehicle transmission controller. Typically, these shifters have shift-lever-position sensors that indicate the position of a shift lever as a way of communicating a selected gear position, and the controller controls shifting of the vehicle's transmission based on these inputs. The vehicle controller is typically connected to other vehicle sensors and is programmed to prevent a driver from making unsafe shifts, such as shifting from a drive gear position into a reverse gear position when the vehicle is traveling too fast. To further prevent electronic shifters from causing the transmission to make unsafe shifts, in some instances solenoid-operated extendable pins or other actuators have been added to prevent movement of the shift lever into an unsafe or otherwise unacceptable gear position. These safety concerns are also relevant to rotary shifting devices.

SUMMARY OF THE INVENTION

According to one aspect of the present invention, a shifter apparatus for operating a transmission controller of a vehicle includes a selection knob that is rotatable between a plurality of angular positions for selecting an operating mode of the transmission controller. A swing arm is configured to engage the selection knob in at least one of the plurality of angular positions. Further, the shifter apparatus includes a motor that is operably coupled with the swing arm and is configured to pivot the swing arm between a locked position that prevents rotation of the selection knob and an unlocked position that allows rotation of the selection knob.

According to another aspect of the present invention, a shifter apparatus for operating a transmission controller of a vehicle includes a selection knob that is rotatable between first and second angular positions for selecting an operating mode of the transmission controller. A swing arm is pivotal between an unlocked position spaced from the selection knob and a locked position engaged with the selection knob to prevent rotation thereof. Further, the shifter apparatus includes a motor configured to pivot the swing arm from the locked position to the unlocked position when a disengagement condition is satisfied for selecting a different operating mode.

According to another aspect of the present invention, a shifter apparatus for operating a transmission controller of a vehicle includes a selection knob and an actuator. The selection knob is rotatable between a first angular position and a second angular position that correspond respectively with a first operating mode and a second operating mode of the transmission controller. The actuator is operably coupled with the selection knob and is configured to automatically rotate the selection knob from the first angular position to the second angular position when a condition is present for the transmission controller to move to the second operating mode.

According to another aspect of the present invention, a method for operating a shifter apparatus includes providing a selection knob that is rotatable between a first angular position and a second angular position that correspond respectively with a first operating mode and a second operating mode of the transmission controller. The method also includes a step of automatically rotating the selection knob from the second angular position to the first angular position when a condition is present for the transmission controller to move to the second operating mode.

According to another aspect of the present invention, a method for operating a shifter apparatus includes providing a selection knob that is rotatable between a first angular position and a second angular position that correspond respectively with a first operating mode and a second operating mode of the transmission controller. The method also includes a step of engaging the selection knob with a locking feature to prevent rotation thereof. Further, the method includes a step disengaging selection knob position when a disengagement condition is satisfied for selecting a different operating mode.

According to yet another aspect of the present invention, a shifter apparatus for operating a transmission controller of a vehicle includes a selection knob that is rotatable between a first angular position and a second angular position that correspond respectively with a drive mode and a park mode of the transmission controller. The shifter apparatus also includes a gear assembly that has a drive gear movable between a disengaged position spaced from the selection knob and an engaged position that meshes with a knob gear of the selection knob. Further, the shifter apparatus includes a motor that is operably coupled with the gear assembly. The motor is configured to rotate the drive gear and thereby rotate the selection knob when the drive gear is in the engaged position, such that the motor automatically moves the selection knob from the first angular position to the second angular position when an ignition of the vehicle is turned off with the transmission controller in the drive mode.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is a top plan view of the shifter apparatus shown in FIG. 5, illustrating the swing arm in a locked position and the selection knob in a park mode position;

FIG. 7 is a top plan view of the shifter apparatus shown in FIG. 5, illustrating the swing arm moved to an unlocked position;

FIG. 8 is a top plan view of the shifter apparatus shown in FIG. 5, illustrating the swing arm in the unlocked position and the selection knob moved to a drive mode position;

DETAILED DESCRIPTION OF THE PREFERRED EMBODIMENTS

Figure 1:
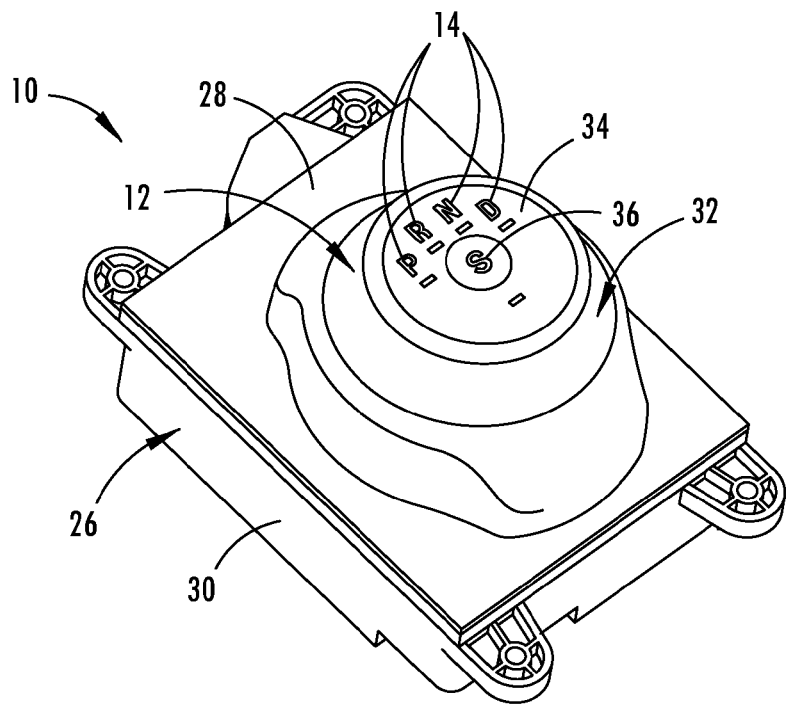
FIG. 1 is a top perspective view of a shifter apparatus, according to one embodiment of the present invention.
Figure 12:
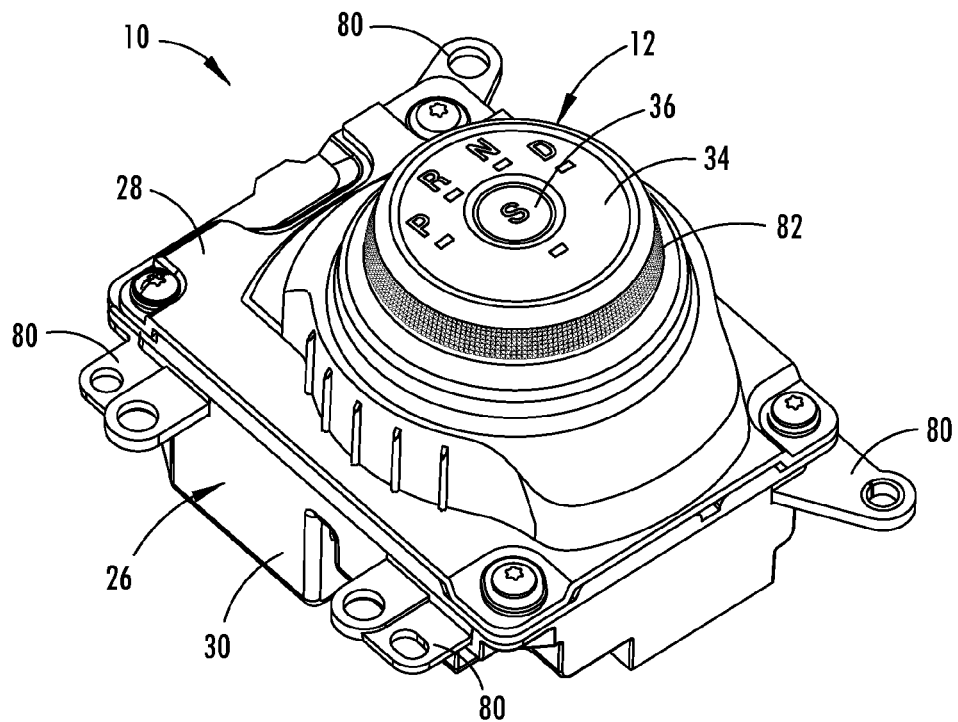
FIG. 12 is a top perspective view of an additional embodiment of the shifter apparatus.

For purposes of description herein, the terms "upper," "lower," "right," "left," "rear," "front," "vertical," "horizontal," and derivatives thereof shall relate to the invention as oriented in the embodiments shown in FIGS. 1 and 12. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-23, reference numeral 10 generally designates a shifter apparatus for operating a transmission of a vehicle. The illustrated embodiments of the shifter apparatus 10 are configured to be mounted to a center counsel of the vehicle, but it is understood that the illustrated embodiment or additional embodiments may be mounted to the instrument panel, the steering column, or other conceivable mounting location within or on a vehicle. The shifter apparatus 10 in the illustrated embodiments includes a rotatable selection knob 12 for inputting or otherwise selecting an operating mode 14 for the transmission. More specifically, the selection knob 12 may be rotatable between a plurality of angular positions for selecting corresponding operating modes 14 of a transmission controller.

With further general reference to the embodiments illustrated in FIGS. 1-23, the shifter apparatus 10 may also includes a locking mechanism that prevents the selection knob 12 from rotating, such as preventing rotation of the selection knob 12 until a brake pedal has been depressed or until the vehicle has reached a speed lower than a threshold speed. According to one embodiment, the locking mechanism of the shifter apparatus 10 includes a swing arm 16 that is pivotal between an unlocked position 18 spaced from the selection knob 12 and a locked position 20 engaged with the selection knob 12 to prevent rotation of the selection knob 12. Further, the shifter apparatus 10 may include a motor 22 configured to pivot the swing arm 16 from the locked position 20 to the unlocked position 18 when a disengagement condition is satisfied for selecting a different operating mode. In addition, the shifter apparatus 10 may be configured with an actuator to automatically rotate the selection knob 12, such as returning the selection knob 12 to an angular position indicative of the park mode (P) when the vehicle is turned off in an operating mode 14 different from the park mode, such as the drive mode (D). Accordingly, some embodiments of the actuator of the shifter apparatus 10 may include a drive gear 24 that is movable to an engaged position that operably connects the motor 22 and the selection knob 12, such that the motor 22 may automatically rotate the selection knob 12 from a first angular position to a second angular position. As such, in the illustrated embodiments, the motor 22 may function to both prevent rotation of the selection knob 12 by pivoting the swing arm 16 into the locked position 20 and to automatically rotate the selection knob 12 to different angular positions. However, it is contemplated that the actuator configured to automatically rotate the selection knob 12 may be additionally or alternatively embodied with hydraulic devices, pneumatic devices, sliding features, or other mechanical and/or electrical devices conceivable to facilitate rotation of the selection knob 12.

With reference to the embodiment illustrated in FIG. 1, the shifter apparatus 10 includes a shifter housing 26 defined by an upper section 28 and a lower section 30 that together substantially enclose a interior volume for concealing and protecting the motor 22, the locking mechanism, and other components of the shifter apparatus 10. The shifter apparatus 10 also includes the rotatable knob 12 protruding through an aperture 32 in the upper section 28 of the shifter housing 26. In the illustrated embodiment, a non-rotatable interior component 34 is provided within a central area of the selection knob 12 that may include light indicators and letters at spaced locations about the interior component 34, such as labeled operating modes 14, shown in the illustrated embodiment with a park mode (P), a reverse mode (R), a neutral mode (N), and a drive mode (D) spaced around a rotational axis of the rotatable knob 12. Furthermore, the illustrated interior component 34 has a central button 36 for selecting a sport mode (S) without requiring rotation of the selection knob 12. It is conceivable that the central button 36 may additionally or alternatively be used to make other sections, such as an overdrive mode, or to actuate other features of the vehicle. It is also conceivable that more or fewer operating modes may be provided to correspond to the transmission controller for the respective vehicle, as operating modes, such as overdrive mode or low mode, may only be provided with the certain vehicles. It is also understood that the interior component 34 may be integrated with the selection knob 12 to be rotatable therewith or that alternative markings, displays, or controls may be provided in additional embodiments.

Figure 2:
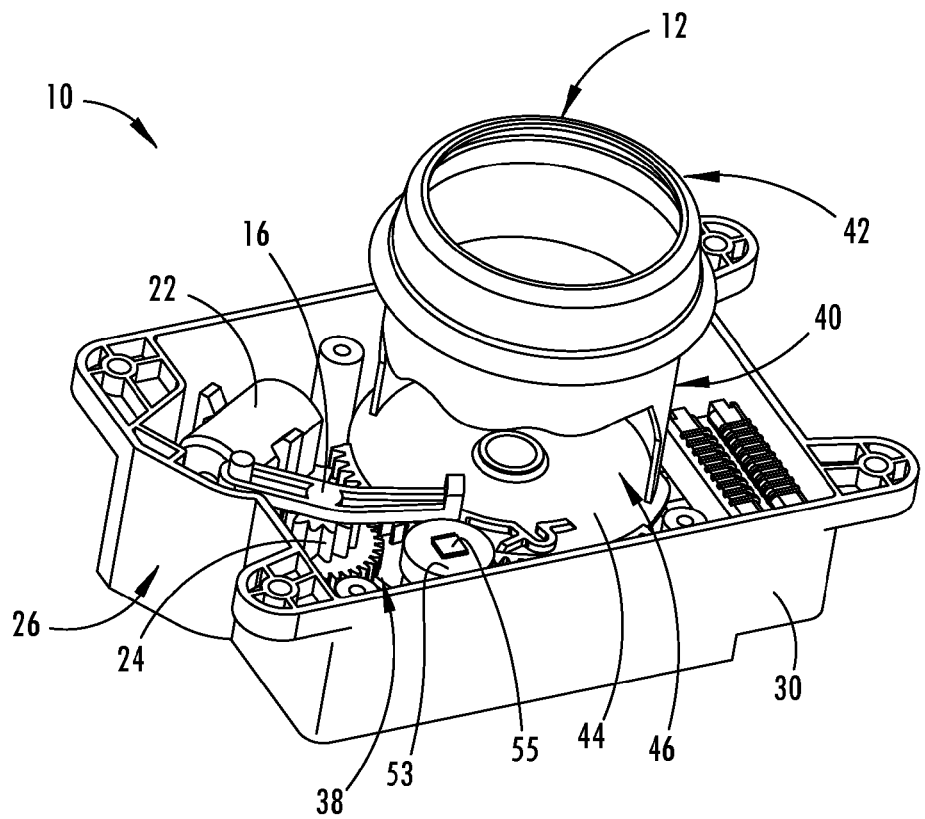
FIG. 2 is a top perspective view of the shifter apparatus of FIG. 1, having an upper section of a shifter housing removed along with portions of a selection knob to expose a gear assembly.

As shown in FIG. 2, the upper section 28 of the shifter housing 26 is removed, exposing a gear assembly 38, the motor 22, and an internal portion 40 of the selection knob 12, among other components. The interior component 34 of the selection knob 12 is also removed to show its generally tubular-shaped construction, including an external portion 42 that protrudes upward from the upper section 28 of the shifter housing 26 for a driver to manipulate. The external portion 42 is configured for the driver to grasp and is defined in the illustrated embodiment by a ring having a larger diameter than the internal portion 40 of the selection knob 12. The internal portion 40 of the selection knob 12 extends down from the external portion 42 to fixedly couple with a knob gear 44 that is coaxially aligned with the selection knob 12. The knob gear 44 is rotatably coupled with the lower section 30 of the shifter housing 26 to provide a rotatable connection between the selection knob 12 and the shifter housing 26. Accordingly, in additional embodiments, the knob gear 44 may be an integral portion of the selection knob 12. In the illustrated embodiment, the internal portion 40 of the selection knob 12 attaches to the knob gear 44 in a manner that defines an opening 46 for allowing the swing arm 16 to pivot into the circumference of the knob gear 44. An additional opening may also provided on an opposite side of the internal portion 40 of the selection knob 12 to define two retention members 48 of the selection knob 12 that engage the knob gear 44, as shown in the additional embodiment illustrated in FIGS. 12-23. It is understood that the internal portion 40 of the selection knob 12 may include more or fewer openings or retention members in connecting with the knob gear 44.

Figure 3:
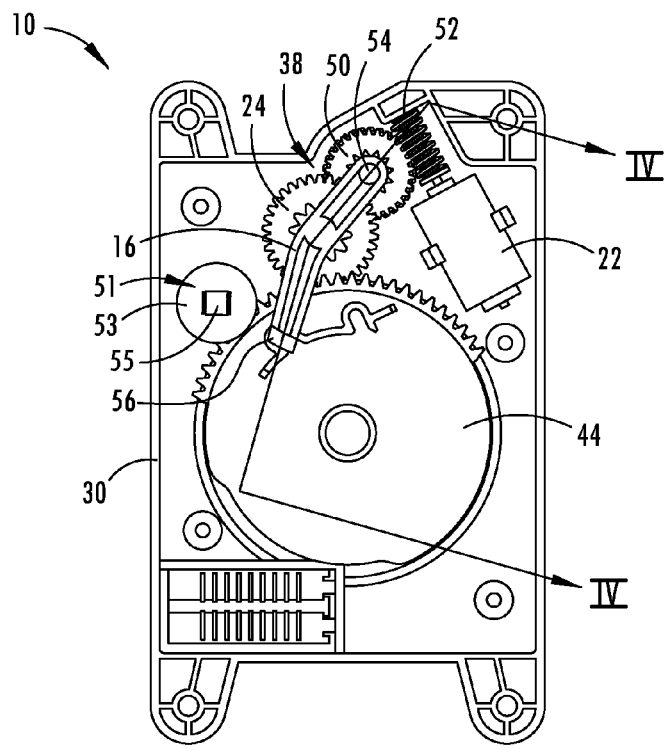
FIG. 3 is a top plan view of the shifter apparatus of FIG. 2, having additional portions of the selection knob removed.

With reference to FIG. 3, the angular position of the selection knob 12, which is used to determine which operating mode for the transmission to operate, may be determined from positional information received from a rotational sensor 51. In the illustrated embodiment, the rotational sensor 51 includes a free-spinning auxiliary gear 53 that is meshed with the knob gear 44 and that has a magnetic portion fixed therewith, whereby rotational movement of the magnetic portion is sensed with a magnetic field sensor 55 for determining the angular position of the selection knob 12 relative to the shifter housing 26 and thereby determining the selected operating mode of the transmission controller. More specifically, the auxiliary gear 53 in the illustrated embodiment includes an over-molded permanent magnet, such as a ferrite ring magnet, and a hall effect sensor is fixed to the upper section 28 of the shifter housing 26 above the auxiliary gear 53 for accurately sensing the rotational movement of the auxiliary gear 53. It is contemplated that the rotational sensor 51 may be alternatively incorporated directly into the knob gear 44 or moved to other positions. Further, it is also understood that additional types of rotational sensors, such as a potentiometer, an optical sensor, or other magnetic sensors, may be employed for determining the rotated angular position of the selection knob 12.

Figure 4:
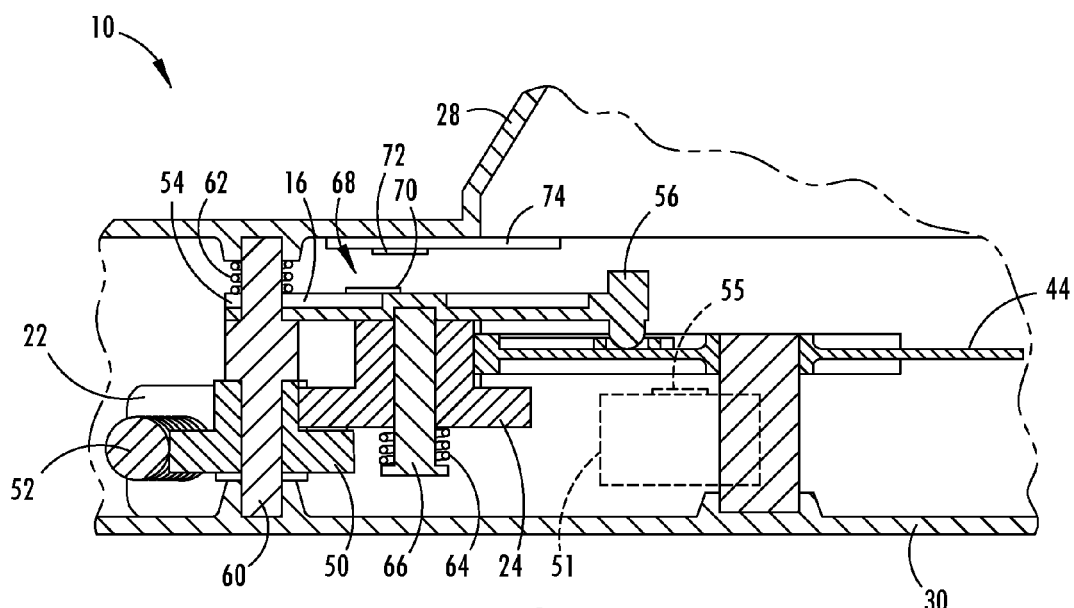
FIG. 4 is a cross-sectional side elevation view of the gear assembly and a swing arm of the shifter apparatus, taken at line IV-IV of FIG. 3.

As illustrated in FIGS. 3 and 4, the gear assembly 38, according to one embodiment, is defined having the drive gear 24 in meshed engagement with an idle gear 50, which is in meshed engagement with a worm gear 52 that is fixedly coupled with the motor 22. The gear assembly 38 is also shown having the drive gear 24 rotatably attached to the swing arm 16, which operates as both the locking mechanism for the selection knob 12 and as a means to move the drive gear 24 into engagement with the knob gear 44 for rotating the selection knob 12. More specifically, the swing arm 16 in the illustrated embodiment includes a first end 54 pivotally coupled with the shifter housing 26 and operably coupled with the motor 22 for pivoting a second end 56 of the swing arm 16 between a locked position 20, an unlocked position 18, and a knob engagement position 58, as described in more detail below. As such, the first end 54 of the swing arm 16 is pivotally coupled with the shifter housing 26 about a central shaft 60 that together have a pivotal axis that extends coaxially through the idle gear 50. The idle gear 50, in the illustrated embodiment, is also rotatably coupled with the shifter housing 26 about the central shaft 60. As illustrated, the idle gear 50 is in constant meshed engagement with the worm gear 52, which is rotated coaxially by the rotor shaft of the motor 22. The idle gear 50 is also in constant meshed engagement with the drive gear 24, which is rotatably attached to an intermediate portion of the swing arm 16, between the first and second ends 54, 56. Differences in the amount of resistance provided on the idle gear 50 by the swing arm 16 and the drive gear 24 determine which movement will occur. Specifically, in the illustrated embodiments, a difference in frictional resistance is provided to configure the motor 22 to actuate both the locking function and the rotational function of the selection knob 12.

With further reference to FIG. 4, a first compression spring 62 is provided between the top surface of the swing arm 16 and the upper section 28 of the shifter housing 26 to bias the swing arm 16 toward the idle gear 50 and create a first frictional resistance there between. Similarly, a second compression spring 64 is provided on a vertical shaft 66 below the drive gear 24 to bias the drive gear 24 upward against the bottom surface of the swing arm 16 and create a second frictional resistance therebetween. In the illustrated embodiment, the first compression spring 62 is configured to provide less resistance, and thereby less friction, than the second compression spring 64 to control the pivoting of the swing arm 16 before rotation of the drive gear 24. As such, the first frictional resistance is configured to be less than the second frictional resistance. Once the resistance to pivot the swing arm 16 increases greater than the resistance provide by the second compression spring 64, the idle gear 50 will rotate the drive gear 24. For instance, when the swing arm 16 is moved into the knob engagement position 58, the swing arm 16 pivots until the drive gear 24 abuts in meshing engagement with the knob gear 44 providing an engaged position, such that the motor 22 may then rotate the selection knob 12 via the drive gear 24. The compression springs 62, 64 in the illustrated embodiment are cylindrical springs with a helical shape, although it is contemplated that alternatively shaped springs, such as conical springs, may be provided. It is also conceivable that the friction between components may controlled with additional or alternative means from compression springs, such as with frictional grease, clock springs, living springs, or other conceivable means to provide such a resistive force.

Figure 5:
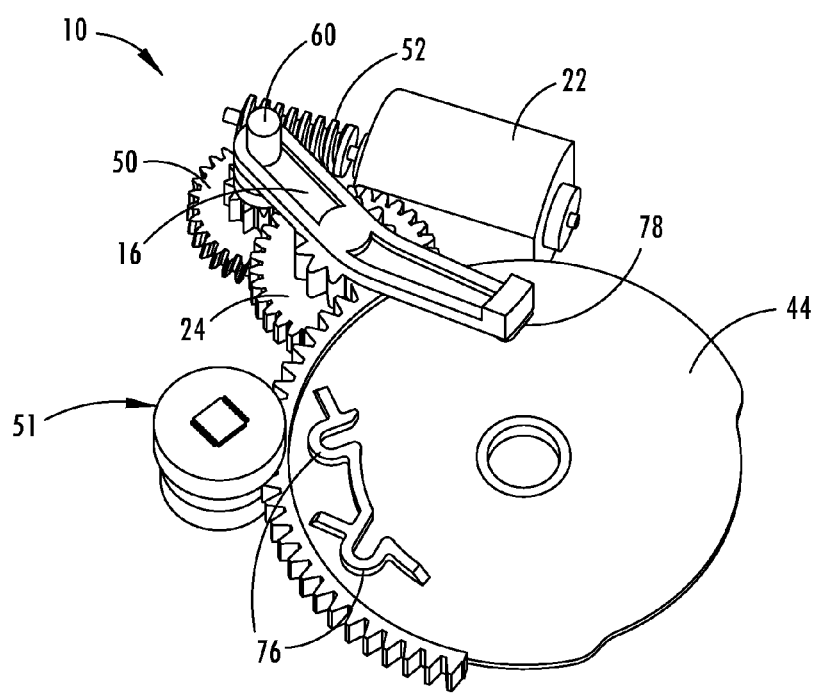
FIG. 5 is a top perspective view of the gear assembly, the swing arm, and a motor of the shifter apparatus of FIG. 2.

As shown in FIGS. 4 and 5, the idle gear 50 and the drive gear 24 each have two different sized teeth patterns to correlate with the intended interfacing gear. More specifically, for both the drive gear 24 and the idle gear 50, the larger teeth are arranged above the smaller teeth with a diameter that is smaller than the smaller teeth. The drive gear 24 and idle gear 50 are meshed, having the smaller teeth of the drive gear interfaced with the larger teeth of the idle gear 50. However, the smaller teeth of the idle gear are arranged in a helical pattern to mesh with the worm gear 52. The drive gear 24 rotates on the vertical shaft 66 that extends down from the swing arm 16, but does not contact the interior surface of the lower section 30 of the shifter housing 26. It is understood that the drive gear 24 and the other gear components of the gear assembly in the illustrated embodiment may, in additional embodiments, include alternative meshed engagement arrangements, such as smooth high-friction wheels that interface the smooth surfaces together or other alternatives, as generally understood by one having ordinary skill in the art.

Referring again to FIG. 4, a positional sensor 68 is provided for sensing the pivoted position of the swing arm 16. The illustrated embodiment of the positional sensor 68 includes a magnet 70 is coupled with the intermediate portion of the swing arm 16 proximate rotational axis of the drive gear 24. A hall effect sensor 72 is coupled with a circuit board 74 that is attached to the upper section 28 of the shifter housing 26. The hall effect sensor 72 senses the position of the magnet 70 to determine the pivoted position of the swing arm 16. It is also understood that the magnet 70 and hall effect sensor 72 may be alternatively positioned with respect to the swing arm 16 and the shifter housing 26. Also, the hall effect sensor 72 may alternatively include other types of magnetic field sensors. Furthermore, it is conceivable that the positional sensor may be configured with additional or alternative sensors, such as optical sensors, proximity sensors, discreet unipolar hall effect sensors, reed switches, mechanical contact switches, or other conceivable alternatives.

Figure 10:
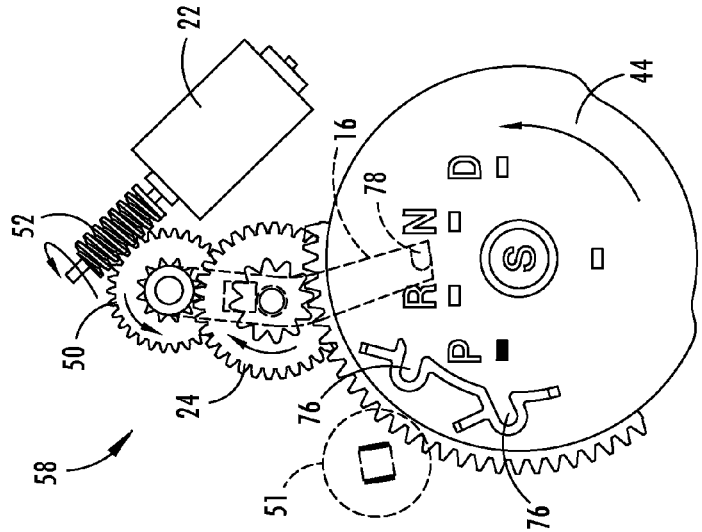
FIG. 10 is a top plan view of the shifter apparatus shown in FIG. 5, illustrating the swing arm in the knob engagement position and the selection knob moved to the park mode position.
Figure 9:
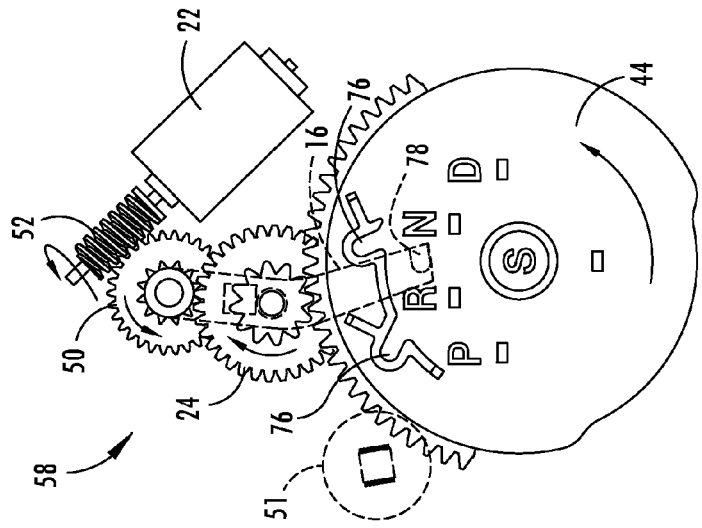
FIG. 9 is a top plan view of the shifter apparatus shown in FIG. 5, illustrating the swing arm moved to a knob engagement position and the selection knob in the drive mode position.

With reference to FIGS. 6-11, the swing arm 16 is shown rotating between the locked position 20 (FIGS. 6 and 11), the unlocked position 18 (FIGS. 7-8), and the knob engagement position 58 (FIGS. 9-10). The second end 56 of the swing arm 16 is engaged with selection knob 12 in the locked position 20 to prevent rotation of selection knob 12. Specifically, in one embodiment, the upper surface of the knob gear 44 includes at least one detent 76 for engaging the second end 56 of the swing arm 16 in the locked position 20. The retention detent 76, also illustrated in FIG. 5, includes a U-shaped slotted feature with an end stop, such that a protrusion 78 extending down from the second end 56 of the swing arm 16 slidably engages the slotted feature and abuts the end stop in the locked position 20. It is contemplated that the swing arm 16 may include the retention detent 76 and the knob gear 44 may then include the protrusion 78 to similarly engage the swing arm 16 in the locked position 20. Further, it is conceivable that the detent 76 may be alternatively shaped, such as not including the end stop, as the position of the swing arm 16 is sensed and may be accurately controlled with the motor 22.

As shown in FIGS. 6-11, the illustrated detents 76 correlate with the locked position 20 of the swing arm 16 in the park mode (P) and the neutral mode (N), thereby allowing the swing arm 16 to prevent rotation of the selection knob 12 with the transmission in either of these modes. However, it is contemplated that different, more, or fewer operating modes may be configured with a retention detent 76 to provide locking functionality of the selection knob 12 in those modes. To rotate the selection knob 12 to select a different gear or operating mode for the transmission, in one embodiment, a disengagement condition must be met, such as by depressing the brake pedal, decreasing the speed of the vehicle below a threshold speed, for example 5 mph, or satisfying additional or alternative conditions, as generally understood by one having ordinary skill in the art. Upon satisfying the disengagement condition, the motor 22 is actuated to rotate the second end 56 of the swing arm 16 out of engagement with the retention detent 76, which thereby allows the selection knob 12 to rotate.

As shown in FIG. 6, the selection knob 12 is in the angular position that correlates with the park mode (P) and the swing arm 16 is in the locked position 20. Accordingly, the protrusion 78 that extends down from the second end 56 of the swing arm 16 is engaged with the slotted feature of the retention detent 76 to prevent rotation of the selection knob 12. Upon satisfying a disengagement condition, such as depressing the brake pedal, the swing arm 16 may be pivoted out of the locked position 20 into the unlocked position 18, as shown in FIG. 7. The pivotal movement of the swing arm 16 is initiated by clockwise rotation of the worm gear 52 by the motor 22, which drives the idle gear 50, and due to the lack of resistance on the swing arm 16, pivots the swing arm 16 in a counter-clockwise direction. Stated differently, the swing arm 16 pivots due to the frictional resistance between the swing arm 16 and the idle gear 50 being less than the frictional resistance between the driver gear 24 and the idle gear 50.

Once the swing arm 16 is in the unlocked position 18, the selection knob 12 may be rotated to select a different operating mode, such as the drive mode (D), as illustrated in FIG. 8. The driver may rotate the selection knob 12 by grasping and rotating the ring of the external portion 42 of the selection knob 12. In some instances, the transmission controller of the vehicle may automatically change the operating mode of the transmission without driver interaction, such as when the vehicle ignition is turned off in the drive mode (D) and the transmission controller automatically changes to the park mode (P). In one embodiment, such an inconsistency between the operating mode of the transmission controller and the angular position of selection knob 12 is a condition that may necessitate the shifter apparatus 10 to automatically rotate the selection knob 12 to an angular position that correlates with the current operating mode of the transmission controller. Other conditions are similarly conceivable for necessitating returning the angular position of the selection knob 12 to an appropriate position that is consistent with the operating mode of the transmission.

As shown in FIG. 9, the swing arm 16 is pivoted further in the counter-clockwise direction from the unlocked position to the knob engagement position 58, whereby the drive gear 24 moves into meshing engagement with the knob gear 44. More specifically, the motor 22 drives the worm gear 52 in the clockwise direction, which again pivots the idle gear 50 and swing arm 16 in the counter-clockwise direction. This counter-clockwise motion of the swing arm 16 continues until the rotational resistance on the swing arm 16 is greater than the rotational resistance on the drive gear 24, which occurs when the drive gear 24 abuts the knob gear 44. In the illustrated embodiment, before achieving the knob engagement position 58, the second compression spring 64, which is biased against the drive gear 24, provides the drive gear 24 with greater frictional loading than that of the swing arm 16, thereby causing the swing arm 16 to rotate before the drive gear 24 will spin. It is also contemplated that in additional embodiments the swing arm 16 may hit a hard stop on the shifter housing 26, causing the swing arm 16 to no longer rotate and the drive gear 24 will be forced to spin. Again, it is also conceivable that the frictional loading may be effectuated with other means than the illustrated compression springs 62, 64.

Figure 11:
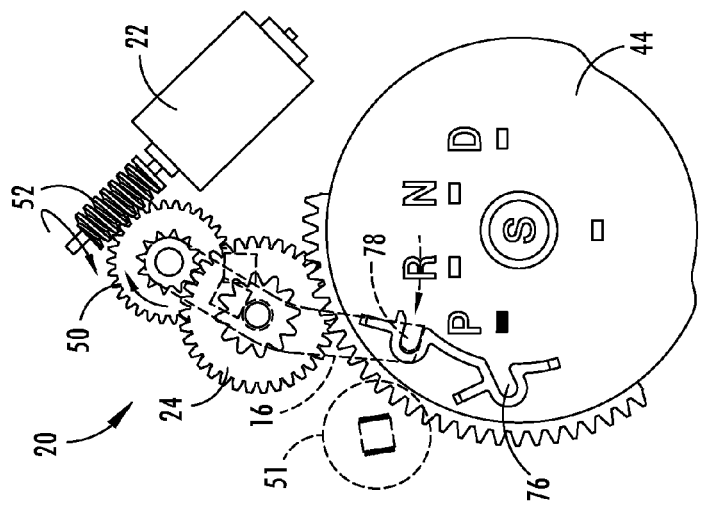
FIG. 11 is a top plan view of the shifter apparatus shown in FIG. 5, illustrating the swing arm moved to the locked position and the selection knob in the park mode position.

Accordingly, as shown in FIG. 10, once the swing arm 16 is in the knob engagement position 58, the continued rotation of the drive gear 24 in meshed engagement with the knob gear 44 causes the selection knob 12 to automatically rotate to the angular position that correlates with the park mode (P) of the transmission controller, or the return position. After the selection knob 12 is rotated to an angular position that correlates with the current operating mode of the transmission controller or another desired operating mode, the swing arm 16 may be pivoted out of the knob engagement position 58, such as back to the locked position, as shown in FIG. 11. This is done by reversing rotation of the motor 22 to cause pivotal movement of the swing arm 16 in the clockwise direction and thereby position the protrusion 78 on the swing arm 16 into locked engagement with the detent 76. To move the swing arm 16 in the reverse away from the knob engagement position, the motor is actuated in the reverse rotational direction to draw the drive gear out of meshed engagement with the knob gear 44 and out of the substantially in line position with the pivotal axis of the swing arm 16 and the central axis of the knob gear 44. Upon movement out of the knob engagement position 58, the motor 22 can continue to rotate to position the second end 56 of the swing arm 16 into the locked position 20 and again preventing rotation of the selection knob 12.

Referring now to FIGS. 12-22, an additional embodiment of the shifter apparatus 10 is illustrated that provides an additional gear in the gear assembly 38 to relocate the motor 22 relative to the selection knob 12 in an effort to reduce the size of the shifter housing 26, in addition to other features and distinctions from the previously illustrated embodiment. Although the features shown and described with reference to this addition embodiment may use like reference numerals to the previously illustrated embodiment, there may be differences described and illustrated, but the described differences or similarities to the previously described embodiment do not limit the potential for other additional embodiments of the disclosed shifter apparatus.

With reference to FIG. 12, the illustrated additional embodiment of the shifter apparatus 10 similarly includes a shifter housing 26 with an upper section 28 and a lower section 30. The lower section 30 of the shifter housing 26 includes attachment flanges 80 protruding laterally to receive fasteners that secure the shifter apparatus 10 to an installation location within or otherwise on a vehicle. It is contemplated that the attachment flanges 80 may be provided in various configurations and quantities to securely install the shifter apparatus 10.

Figure 13:
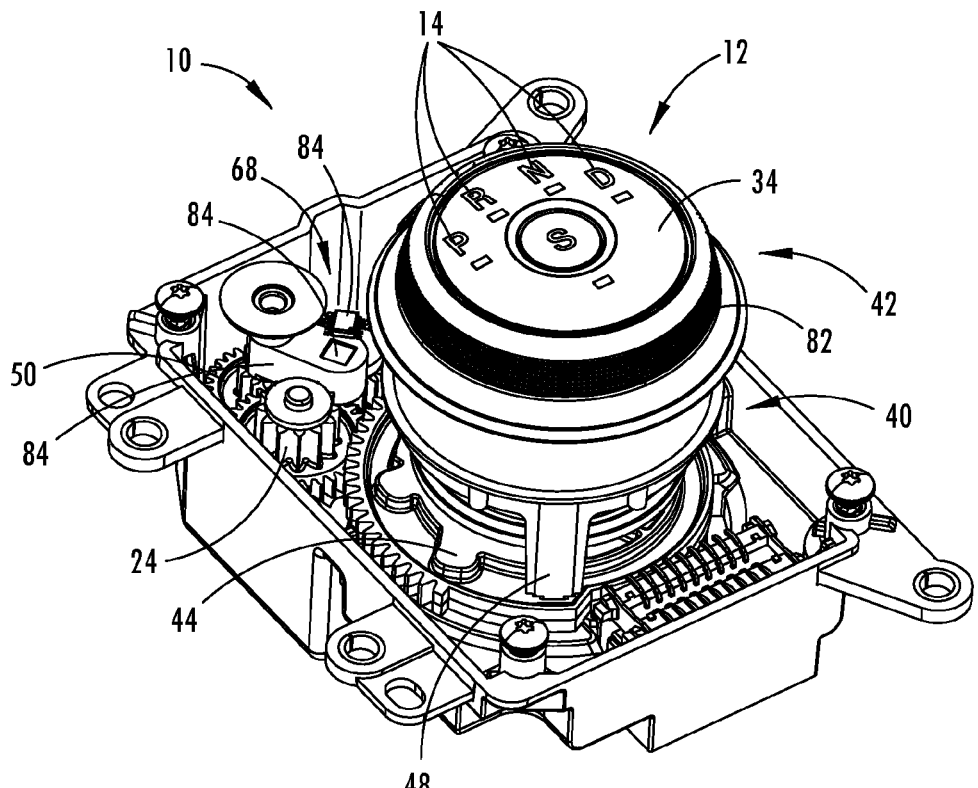
FIG. 13 is a top perspective view of the additional embodiment of the shifter apparatus of FIG. 12, having an upper section of a shifter housing removed along with portions of a selection knob to expose a gear assembly.

As also shown in FIG. 13, the selection knob 12 of the additional embodiment of the shifter apparatus 10 is provided with a surface pattern on the ring 82 of the external portion 42. This surface pattern may be provided on an elastomeric material, polymeric material, or metallic material to provide increased friction to the driver when grasping and manipulating the ring 82 of the selection knob 12. As previously mentioned, the ring 82 rotates relative to the generally fixed interior component 34 of the selection knob 12 that is provided with letters and lights indicating the various operating modes 14. The ring 82 is, in turn, fixed relative to the knob gear 44, such that rotation of the ring 82 results in simultaneous and coaxial rotation of the knob gear 44. In the illustrated embodiment, retention members 48 (FIG. 16) are provided on the internal portion 40 of the selection knob 12 to connect the ring 82 with the knob gear 44.

Figure 14:
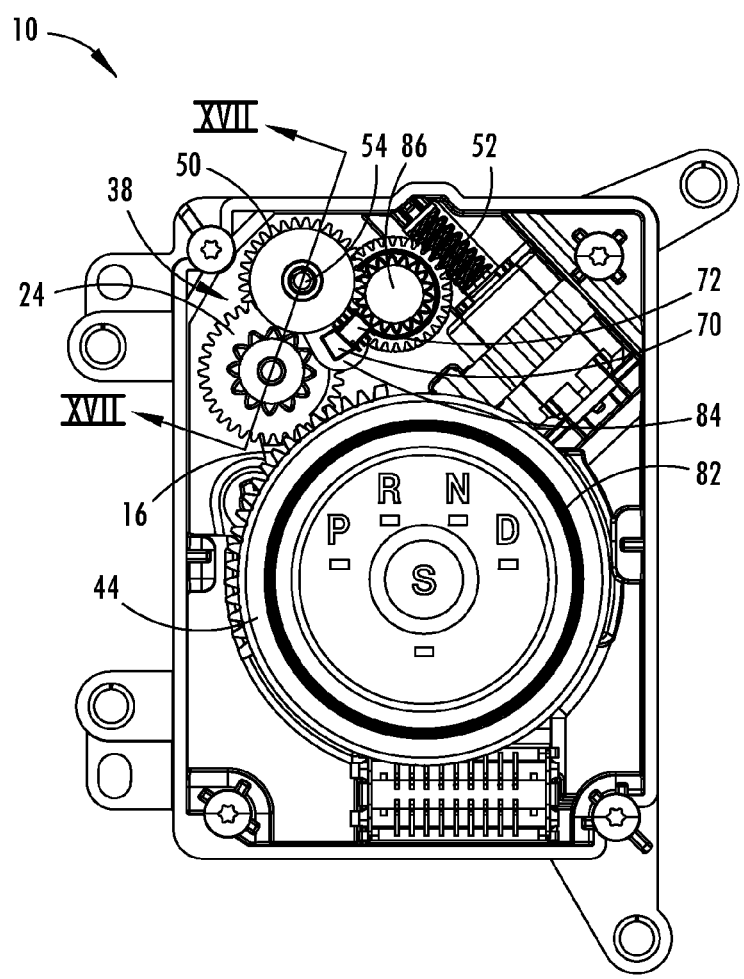
FIG. 14 is a top plan view of the shifter apparatus of FIG. 13.

With reference to FIGS. 13 and 14, an additional embodiment of the swing arm 16 is shown having a platform member 84 fixed to the first end 54 of the swing arm 16 and protruding toward the second end 56 of the swing arm 16, such that the idle gear 50 is spaced between the platform member 84 and the swing arm 16. The platform member 84 is fixed to the swing arm 16 to provide a functional surface for monitoring the position of the swing arm 16. More specifically, a positional sensor 68 is incorporated with the platform member 84, whereby a magnet 70 is coupled with an upper surface of the platform member 84 and a hall-effect sensor 72 is positioned above the platform member 84 at a spaced distance to sense pivoting movement of the platform member 84 and thereby the swing arm 16. Again, it is contemplated that additional types of positional sensors may be used, including with incorporation of the platform member 84, to sense pivotal movement of the swing arm 16.

As also illustrated in FIG. 14, the above-referenced additional gear of the gear assembly 38 is shown. In this embodiment, the additional gear is a connecting gear 86 that meshes between the idle gear 50 and the worm gear 52. As such, the teeth of the connecting gear 86 are arranged in a larger diameter and are formed in a helical pattern to mesh with worm gear 52 and the larger teeth are arranged in a smaller diameter and are configured to mesh with the teeth arranged in the larger diameter on the idle gear 50. The addition of the connecting gear 86 allows more variation in locating the motor 22 relative to the first end 54 of the swing arm 16. Similar to the previously described embodiment, the first end 54 of the swing arm 16 includes the pivotal axis of the swing arm 16, which coincides with the rotational axis of the idle gear 50. Accordingly, it is contemplated that additional gears or connections may be provided between the idle gear 50 and the motor 22 in addition to or in the alternative to the connecting gear 86.

Figure 15:
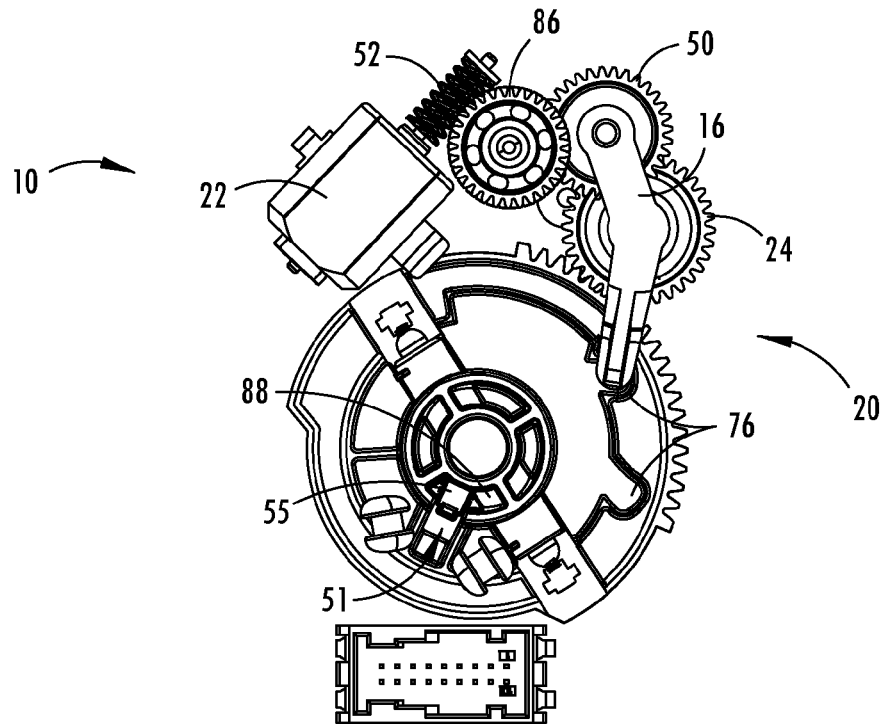
FIG. 15 is a bottom plan view of the shifter apparatus of FIG. 12, having the shifter housing removed.
Figure 16:
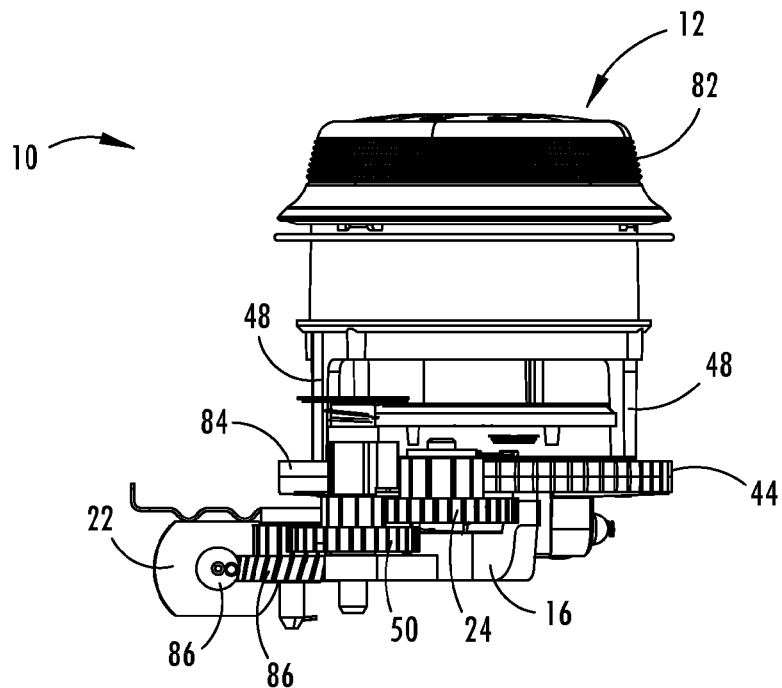
FIG. 16 is a side elevation view of the shifter apparatus of FIG. 15.

With reference to FIGS. 15 and 16, the illustrated embodiment of the swing arm 16 interfaces with a bottom surface of the knob gear 44. Accordingly, the bottom surface of the knob gear 44 includes the retention detents 76 protruding down from the bottom surface. The protrusion 78 on the second end 56 of the swing arm 16 extends upward to engage the retention detents 76 with the swing arm 16 in the locked position 20, as shown in FIGS. 15 and 18. Similar to the previously illustrated embodiment, the retention detents 76 in the embodiment illustrated in FIGS. 12-22 provide a slot for the protrusion 78 to engage and thereby prevent rotational movement of the knob gear 44. Again, additional embodiments are contemplated for an interface between the detents 76 and the protrusion 78.

As also can be seen in FIG. 15, an additional embodiment of the rotational sensor 51 is integrated with the knob gear 44, eliminating an auxiliary gear 53 as shown in the previously illustrated embodiment. For the rotational sensor 51 to function, the knob gear 44 is provided with a magnetic portion 88 and a magnetic field sensor 55 is fixed to the shifter housing 26 below the magnetic portion 88, such that the magnetic field sensor 55 senses rotational movement of the knob gear 44 and in turn determines the angular position of the selection knob 12. Again, additional embodiments of the rotational sensor 51 are contemplated.

Figure 17:
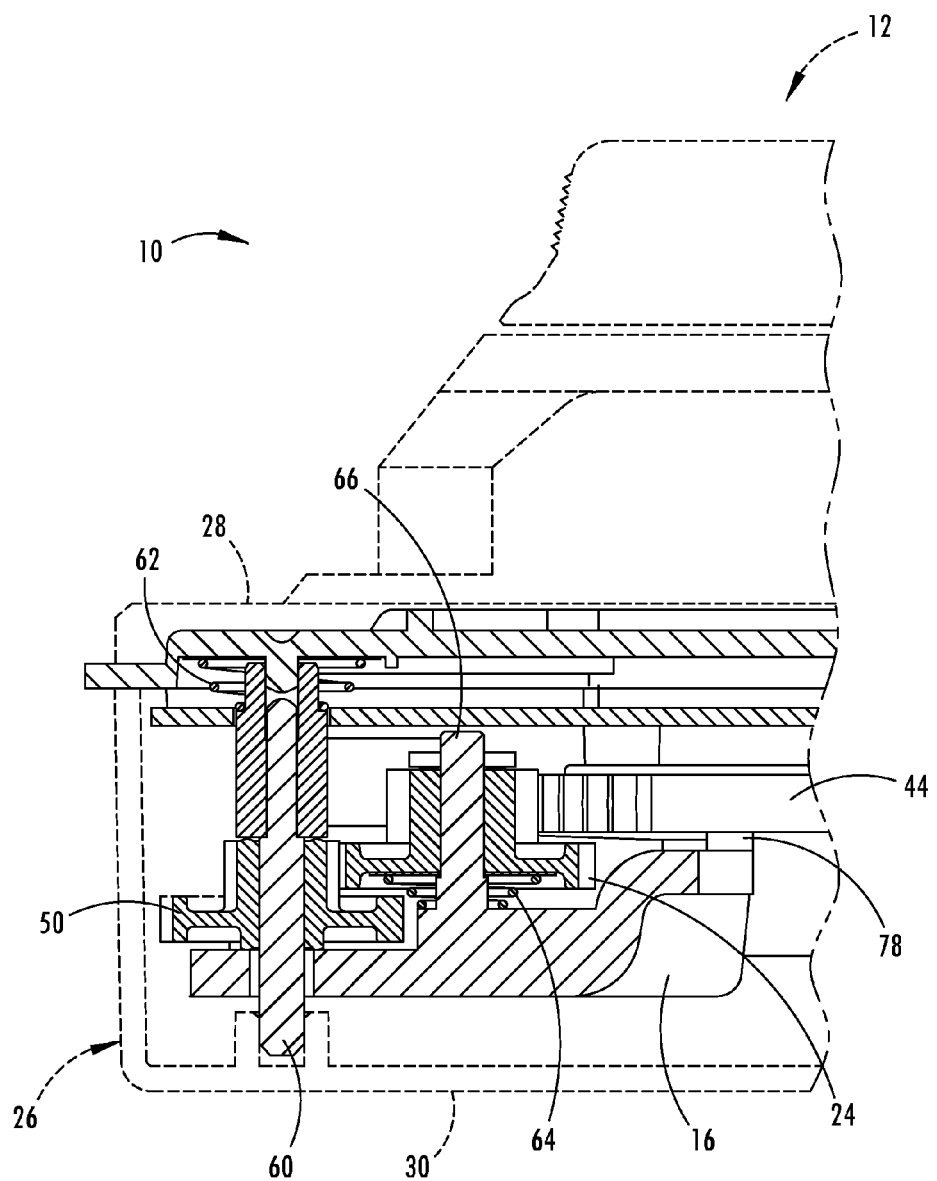
FIG. 17 is a cross-sectional side elevation view of the gear assembly and the swing arm of the shifter apparatus, taken at line XVII-XVII of FIG. 14.
Figure 18:
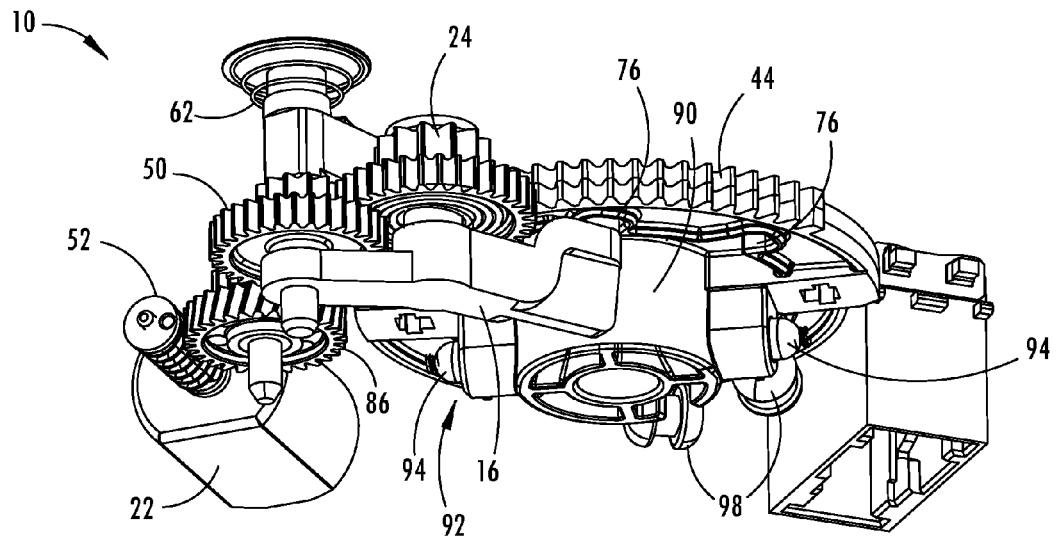
FIG. 18 is a bottom perspective view of the gear assembly, the swing arm, and a motor of shifter apparatus of FIG. 12.

As shown in FIGS. 17 and 18, the idle gear 50 is similarly configured to both pivot the swing arm 16 and to rotate the selection knob 12 based on the degree of resistance encountered. In the illustrated embodiment, compression springs are again provided to generate friction at the pivotal axis of the swing arm 16 and the rotational axis of the drive gear 24. The first compression spring 62 has a conical shape, whereby the narrow end of the first compression spring 62 faces downward toward the swing arm 16 and the large diameter end of the first compression spring 62 abuts an interior surface of the upper section 28 of the shifter housing 26. The second compression spring 64, in the illustrated embodiment, also includes a conical shape with the narrow end directly abutting an upper surface of the swing arm 16 and a large diameter end of the second compression spring 64 abutting a bottom surface of the drive gear 24. The second compression spring 64 thereby creates frictional resistance for the drive gear 24 to rotate about the vertical shaft 66 integrally protruding upward from the swing arm 16. Again, in the illustrated embodiment, the first compression spring 62 provides less resistance than the second compression spring 64 to pivot the swing arm 16 before rotation of the drive gear 24. More specifically, in one embodiment the first compression spring 62 may provide 10 N of force and the second compression spring 64 may provide 22 N of force. It is appreciated that these differentiating forces may be varied in magnitude and in difference in additional embodiments.

Figure 19:
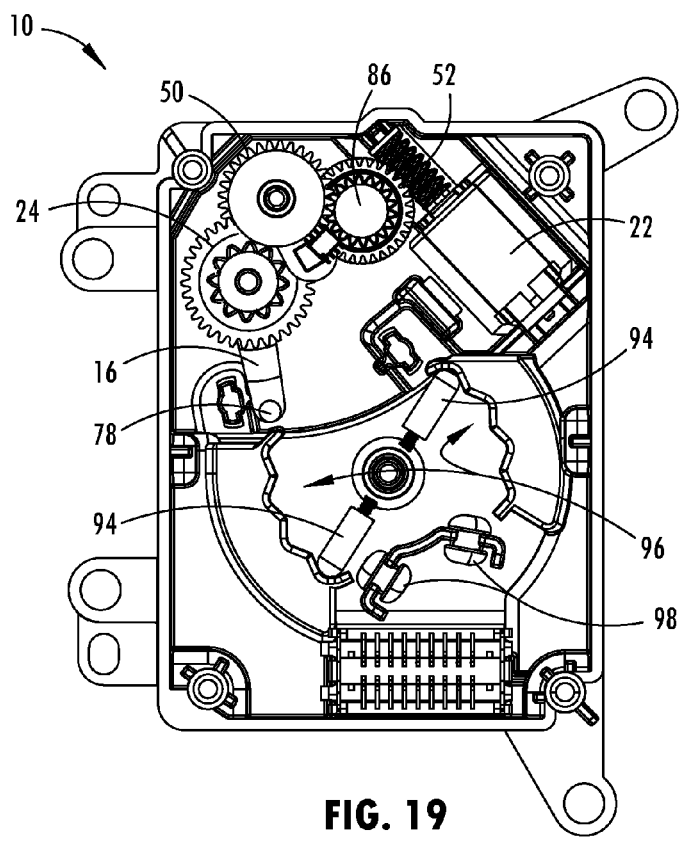
FIG. 19 is a top plan view of the shifter apparatus of FIG. 12, having an upper portion of the selection knob and the shifter housing removal to show a gate of the shifter housing interfacing with a rotational inhibitor of the selection knob.

As illustrated in FIGS. 18 and 19, the knob gear 44 has a downward extending cylindrical extension 90 that is an integral portion of the knob gear 44 in the illustrated embodiment. The cylindrical extension 90 is provided with a rotational inhibitor 92 that provides tactical feedback to the driver upon rotational movement of the selection knob 12 between the angular positions that correspond with different operating modes of the transmission controller. As shown, the rotational inhibitor 92 includes a pair of plungers 94 spring biased away from the rotational axis of the knob gear 44. The lower section 30 of the housing 26 is formed to include a gate 96 that interfaces with the plungers 94. The gate 96, as shown in FIG. 19, has a curved shape that defines a series of rounded peaks and valleys, such that the pair of plungers 94 both simultaneously reside in a valley and both simultaneously encounter a peak upon rotation of the selection knob 12. As such, moving from one valley to the next and overcoming a peak provides resistive torque to the selection knob 12 for the plungers 94 to overcome the peak and then a reduced rotational torque in the valley, which together results in tactical feedback to the driver upon rotation of the selection knob 12. The valleys are spaced about the rotational axis of the knob gear 44 to coincide with the operating modes 14 of the selection knob 12. Elastomeric bumpers 98 are provided at end points of the gate 96 to prevent over-rotation of the selection knob 12. However, it is contemplated that the gates 96 may allow the selection knob 12 to rotate at varying amounts, including a full 360 degree rotation of the selection knob 12.

Figure 20:
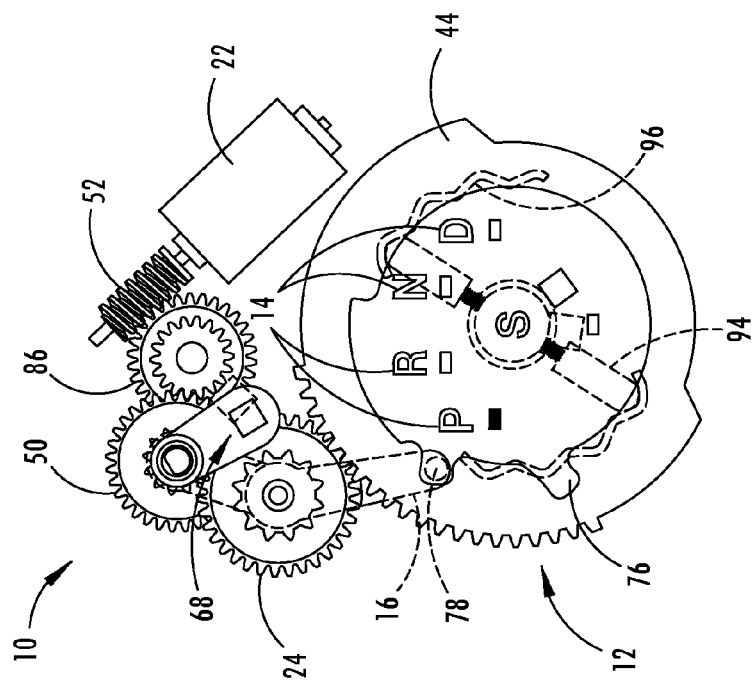
FIG. 20 is a top plan view of the shifter apparatus shown in FIG. 15, illustrating the swing arm in a locked position and the selection knob in a park mode position with the gate shown in dashed lines.
Figure 21:
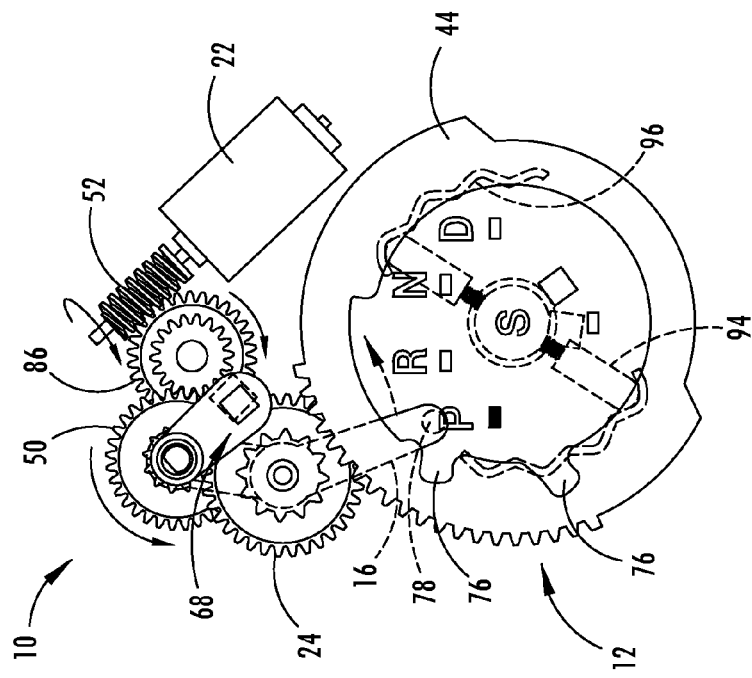
FIG. 21 is a top plan view of the shifter apparatus shown in FIG. 15, illustrating the swing arm moved to an unlocked position.
Figure 23:
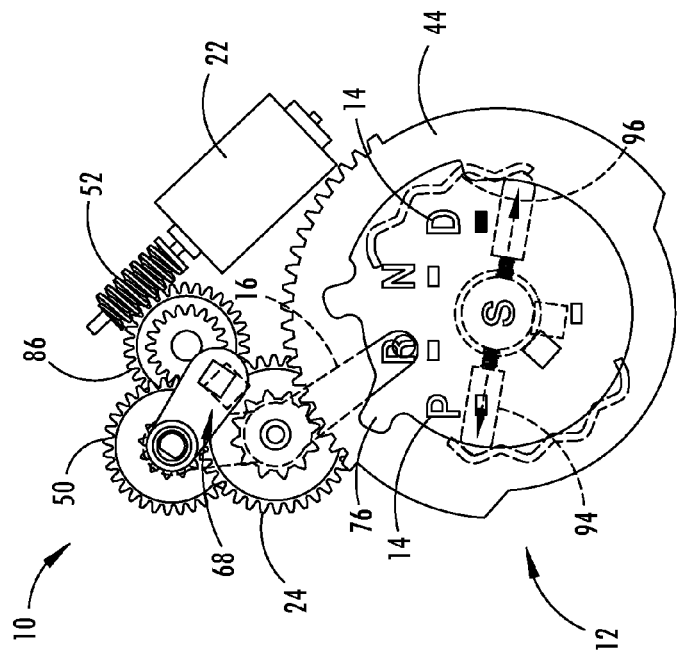
FIG. 23 is a top plan view of the shifter apparatus shown in FIG. 15, illustrating the swing arm moved to the knob engagement position and the selection knob in the drive mode position.
Figure 22:
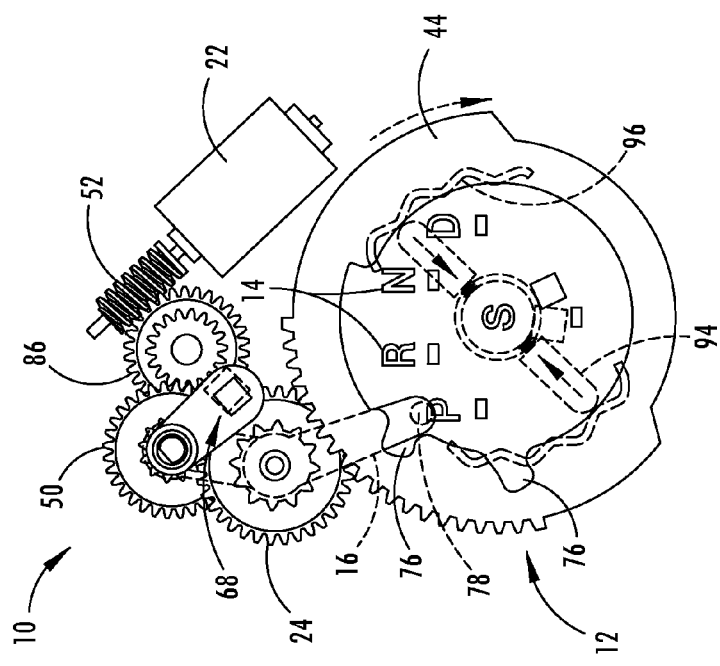
FIG. 22 is a top plan view of the shifter apparatus shown in FIG. 15, illustrating the swing arm in the unlocked position and the selection knob moving out of the park mode position.

Referring now to FIGS. 20-23, functional movement of this additional embodiment of the shifter apparatus 10 is illustrated in various positions. As shown in FIG. 20, the selection knob 12 is an angular position that correlates with the park mode (P) and the swing arm 16 is in the locked position 20. In this angular position, the selection knob 12 positions the rotational inhibitor 92 in the furthest most counterclockwise position available. Upon satisfying a disengagement condition, the swing arm 16 may be pivoted out of the locked position 20 and into the unlocked position 18, as shown in FIG. 21. Movement of the swing arm 16, similar to the previously described embodiment, is initiated by counterclockwise rotation of the worm gear 52 to rotate the connecting gear 86 in the clockwise direction, and thereby rotate the idle gear 50 and the swing arm 16 in the counterclockwise direction, as shown in FIG. 21. Upon moving the swing arm 16 to the unlocked position 18, the driver may rotate the selection knob 12 to a different angular position, whereby the rotational inhibitor 92 provides tactical feedback to the driver that a different operating mode is being selected. As shown in FIG. 22, the selection knob 12 is being rotated clockwise from the park position to the reverse position and the pair of plungers 94 are being forced radially inward as they transition in the gate 96 from the valley that corresponds with the park mode to the valley that corresponds with the reverse mode. This rotational inhibitor 92 may provide a clicking noise to also give audible feedback to the driver that the selection knob 12 is being rotated to a different operating mode 14. It is contemplated the rotational inhibitor 92 in additional embodiments may include alternative means to generate tactile feedback to the driver upon rotating the selection knob 12. Continued rotation of the selection knob 12 in the clockwise direction will eventually position the selection knob 12 in the drive mode position, as shown in FIG. 23.

It will be understood by one having ordinary skill in the art that construction of the described invention and other components is not limited to any specific material. Specifically, the gears may be metal, polymer, or other rigid materials and the swing arm may be molded, cast, stamped, or any number of manufacturing processes with various materials. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A shifter apparatus for operating a transmission controller of a vehicle, comprising:
   a selection knob rotatable between a plurality of angular positions for selecting an operating mode of the transmission controller;
   a swing arm configured to engage the selection knob in at least one of the plurality of angular positions;
   a motor operably coupled with the swing arm and configured to pivot the swing arm between a locked position that prevents rotation of the selection knob and an unlocked position that allows rotation of the selection knob; and
   a drive wheel coupled with the swing arm, wherein the swing arm is further pivotal to a knob engagement position that operably engages the drive wheel between the motor and the selection knob, thereby allowing the motor to rotate the selection knob.

2. The shifter apparatus of claim 1, further comprising:
   a housing covering the motor and the swing arm, wherein a first end of the swing arm is pivotally coupled with the housing and a second end of the swing arm engages the selection knob in the locked position.

3. The shifter apparatus of claim 1, wherein the selection knob has a rotational inhibitor that provides tactile feedback upon rotational movement between the plurality of angular positions, and wherein the operating mode includes one of a park mode, a reverse mode, a neutral mode, and a drive mode.

4. The shifter apparatus of claim 1, further comprising:
   a positional sensor for sensing a rotational position of the swing arm to determine when the swing arm is in the locked and unlocked positions.

5. The shifter apparatus of claim 4, wherein the positional sensor includes a hall effect sensor for sensing a magnetic feature on the swing arm to determine the rotated position of the swing arm.

6. A shifter apparatus for operating a transmission controller of a vehicle, comprising:
   a selection knob rotatable between a plurality of angular positions for selecting an operating mode of the transmission controller;
   a swing arm configured to engage the selection knob in at least one of the plurality of angular positions;
   a motor operably coupled with the swing arm and configured to pivot the swing arm between a locked position that prevents rotation of the selection knob and an unlocked position that allows rotation of the selection knob; and
   a drive gear coupled with the swing arm, wherein the swing arm is further pivotal to a knob engagement position that operably engages the drive gear between the motor and the selection knob, thereby allowing the motor to rotate the selection knob.

7. The shifter apparatus of claim 6, wherein the selection knob includes a knob gear coaxially aligned with a rotational axis of the selection knob, and wherein the drive gear meshes with the knob gear to rotate the selection knob to one of the plurality of angular positions.

8. The shifter apparatus of claim 6, wherein a first end of the swing arm includes an idle gear coaxially aligned with a pivotal axis of the swing arm, and wherein the motor drives the selection knob to the desired angular position via the idle gear.

9. A shifter apparatus for operating a transmission controller of a vehicle, comprising:
   a selection knob rotatable between first and second angular positions for selecting an operating mode of the transmission controller;
   an arm movable between an unlocked position spaced from the selection knob and a locked position engaged with the selection knob to prevent rotation thereof; and
   a motor configured to move the arm from the locked position to the unlocked position when a disengagement condition is satisfied for selecting a different operating mode;
   wherein the arm is movable to a knob engagement position that operably engages the motor and the selection knob, thereby allowing the motor to rotate the selection knob;
   a drive wheel operably engaging between the motor and the selection knob when the arm is in the knob engagement position;
   an idle wheel coaxially aligned with a plane of movement of the swing arm; and
   a knob wheel coaxially aligned with a rotational axis of the selection knob, wherein the idle wheel frictionally engages with the drive wheel and the drive wheel frictionally engages with the knob wheel to rotate the selection knob.

10. The shifter apparatus of claim 9, wherein the disengagement condition includes a brake pedal of the vehicle being depressed.

11. The shifter apparatus of claim 9, wherein the arm is pivotal to a knob engagement position that operably engages the motor and the selection knob, thereby allowing the motor to rotate the selection knob.

12. The shifter apparatus of claim 11, wherein the different operating modes include a park mode, a reverse mode, a neutral mode, and a drive mode, and wherein the knob engagement position is configured to automatically rotate the selection knob to the park mode.

13. The shifter apparatus of claim 11, further comprising:
   a drive gear operably engaging between the motor and the selection knob when the arm is in the knob engagement position.

14. The shifter apparatus of claim 9, further comprising:
   a positional sensor sensing the arm to monitor the pivoted position of the arm and determine when to actuate the motor.

15. A shifter apparatus for operating a transmission controller of a vehicle, comprising:
   a selection knob rotatable between first and second angular positions for selecting an operating mode of the transmission controller;
   a swing arm pivotal between an unlocked position spaced from the selection knob and a locked position engaged with the selection knob to prevent rotation thereof; and
   a motor configured to pivot the swing arm from the locked position to the unlocked position when a disengagement condition is satisfied for selecting a different operating mode;

wherein the swing arm is pivotal to a knob engagement position that operably engages the motor and the selection knob, thereby allowing the motor to rotate the selection knob;

a drive gear operably engaging between the motor and the selection knob when the swing arm is in the knob engagement position;

wherein the drive gear has a frictional resistance for rotating that is configured for the motor to rotate the selection knob via the drive gear when the swing arm encounters resistance greater than the frictional resistance of the drive gear.

16. A shifter apparatus for operating a transmission controller of a vehicle, comprising:

a selection knob rotatable between first and second angular positions for selecting an operating mode of the transmission controller;

a swing arm pivotal between an unlocked position spaced from the selection knob and a locked position engaged with the selection knob to prevent rotation thereof; and a motor configured to pivot the swing arm from the locked position to the unlocked position when a disengagement condition is satisfied for selecting a different operating mode;

wherein the swing arm is pivotal to a knob engagement position that operably engages the motor and the selection knob, thereby allowing the motor to rotate the selection knob;

a drive gear operably engaging between the motor and the selection knob when the swing arm is in the knob engagement position;

an idle gear coaxially aligned with a pivotal axis of the swing arm; and a knob gear coaxially aligned with a rotational axis of the selection knob, wherein the idle gear meshes with the drive gear and the drive gear meshes with the knob gear to rotate the selection knob.

17. A shifter apparatus for operating a transmission controller of a vehicle, comprising:

a selection knob rotatable between a first angular position and a second angular position that correspond respectively with a first operating mode and a second operating mode of the transmission controller; and an actuator operably coupled with the selection knob and configured to automatically rotate the selection knob from the first angular position to the second angular position when a condition is present for the transmission controller to move to the second operating mode;

wherein the actuator comprises:

a subassembly having a drive wheel movable between a disengaged position spaced from the selection knob and an engaged position that meshes with a frictional surface of the selection knob; and a motor operably coupled with the subassembly and configured to rotate the drive wheel and thereby rotate the selection knob when the drive wheel is in the engaged position, such that the motor moves the selection knob from the first angular position to the second angular position when the condition is present, wherein the condition includes an ignition of the vehicle being turned off with the transmission controller in a drive mode.

18. The shifter apparatus of claim 17, further comprising:

a swing arm pivotal between an unlocked position spaced from the selection knob and a locked position engaged with the selection knob to prevent rotation thereof.

19. A shifter apparatus for operating a transmission controller of a vehicle, comprising:

a selection knob rotatable between a first angular position and a second angular position that correspond respectively with a first operating mode and a second operating mode of the transmission controller; and an actuator operably coupled with the selection knob and configured to automatically rotate the selection knob from the first angular position to the second angular position when a condition is present for the transmission controller to move to the second operating mode;

wherein the actuator comprises:

a gear assembly having a drive gear movable between a disengaged position spaced from the selection knob and an engaged position that meshes with a knob gear of the selection knob; and a motor operably coupled with the gear assembly and configured to rotate the drive gear and thereby rotate the selection knob when the drive gear is in the engaged position, such that the motor moves the selection knob from the first angular position to the second angular position when the condition is present, wherein the condition includes an ignition of the vehicle being turned off with the transmission controller in a drive mode.

20. The shifter apparatus of claim 19, further comprising:

a swing arm pivotal to a knob engagement position that places the drive gear in the engaged position, wherein the drive gear has a first frictional resistance for rotating relative to the swing arm that is greater than a second frictional resistance for pivoting the swing arm, such that the motor rotates the drive gear when the swing arm encounters resistance greater than the first frictional resistance.

21. A shifter apparatus for operating a transmission controller of a vehicle, comprising:

a selection knob rotatable between a plurality of angular positions for selecting an operating mode of the transmission controller;

an arm configured to engage the selection knob in at least one of the plurality of angular positions;

a motor operably coupled with the arm and configured to translatingly move the arm between a locked position that prevents rotation of the selection knob and an unlocked position that allows rotation of the selection knob; and a drive wheel coupled with the arm, wherein the arm is further translatingly movable to a knob engagement position that operably engages the drive wheel between the motor and the selection knob, thereby allowing the motor to rotate the selection knob.

* * * * *